(12) United States Patent
Bracha et al.

(10) Patent No.: US 6,430,569 B1
(45) Date of Patent: Aug. 6, 2002

(54) METHODS AND APPARATUS FOR TYPE SAFE, LAZY, USER-DEFINED CLASS LOADING

(75) Inventors: Gilad Bracha, Los Altos; Sheng Liang, Mountain View, both of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/134,477

(22) Filed: Aug. 14, 1998

(51) Int. Cl.$^7$ ................................................ G06F 17/30
(52) U.S. Cl. ................................. 707/103 R; 707/104.1
(58) Field of Search .......................... 707/103 R, 104.1; 717/11, 1, 5, 7, 9, 10; 709/202, 203, 213, 223; 714/727

(56) References Cited

U.S. PATENT DOCUMENTS

| | | | | |
|---|---|---|---|---|
| 6,061,721 A | * | 5/2000 | Ismael et al. ................ | 709/223 |
| 6,223,346 B1 | * | 4/2001 | Tock ............................. | 717/11 |
| 6,237,135 B1 | * | 5/2001 | Timbol ......................... | 717/1 |

OTHER PUBLICATIONS

James Gosling, et al., The Java™ Language Specification (Addison–Wesley, 1996).
Tim Lindholm and Frank Yellin, The Java™ Virtual Machine Specification (Addison–Wesley 2$^{nd}$ Ed. 1997–1999).
J. Stanley Warford, BlackBox: A New Object–Oriented Framework for CS1/CS2, ACM Press (1998).
"java.lang: Class ClassLoader", visited at http://www.javasoft.com/products/j . . . ocs/api/java/lang/ClassLoader.html on Oct. 15, 1999, 14 pages.
"Oberon Microsystems: Component Software Resources", visited at http://www.oberon.ch/resources/index.html#Component Pascal on Oct. 15, 1999, 5 pages.
"Oberon Microsystems: The Evolution of Oberon–2 to Component Pascal", visited at http://www.oberon.ch/resources/component_pascal/evolution.html on Oct. 15, 1999, 12 pages.
"Oberon Microsystems: Component Pascal Language Report", visited at http://www.oberon.ch/resources/component_pascal/language_report.html on Oct. 15, 1999, 29 pages.
"Oberon Microsystems: Brief Comparison of Component of Component Pascal and Java", visted at http://www.oberon.ch/resources/component_pascal/java_component_pascal.html on Oct. 15, 1999, 3 pages.

* cited by examiner

Primary Examiner—Diane D. Mizrahi
(74) Attorney, Agent, or Firm—Finnegan, Henderson, Farabow, Garrett & Dunner, L.L.P.

(57) ABSTRACT

Type safe linkage is ensured by establishing a constraint if a class references an attribute that is contained in another class. This constraint acts as a "promise" to later ensure type safe linkage. At some point later—such as at the earliest time that the type is loaded by both loaders—the constraint is verified. This may be accomplished by verifying that the type for the attribute is the same regardless of whether it is loaded by a loader that defines the referencing class or a loader that defines the referred class. If the constraint is not met, an error message is provided.

39 Claims, 3 Drawing Sheets

METHODS AND APPARATUS FOR TYPE SAFE, LAZY, USER-DEFINED CLASS LOADING

BACKGROUND OF THE INVENTION

A. Field of the Invention

This invention relates generally to class loading, and, more particularly, to methods and apparatus for ensuring type safe linkage of classes in an environment that employs multiple runtime name spaces, user-defined class loaders, and lazy loading of classes.

B. Description of the Related Art

Object-oriented programming techniques have revolutionized the computer industry. For example, such techniques offer new methods for designing and implementing computer programs using an application programming interface (API) with a predefined set of "classes," each of which provides a template for the creation of "objects" sharing certain attributes determined by the class. These attributes typically include a set of data fields and a set of methods for manipulating the object.

The Java™ Development Kit (JDK) from Sun Microsystems, Inc., for example, enables developers to write object-oriented programs using an API with classes defined using the Java™ object-oriented programming language.[1] The Java API consists of a class library having predefined classes. The class library defines a hierarchy of classes with a child class (i.e., subclass) inheriting attributes (i.e., fields and methods) of its parent class. Instead of having to write all aspects of a program from scratch, programmers can simply include selected classes from the API in their

[1] The Java™ programming language is an object-oriented programming language that is described, for example, in a text entitled "The Java Language Specification" by James Gosling, Bill Joy, and Guy Steele, Addison-Wesley, 1996. Sun, Sun Microsystems, the Sun Logo, Java, and JavaSoft and are trademarks or registered trademarks of Sun Microsystems, Inc. in the United States and other countries.

programs and extend the functionality offered by such classes as required to suit the particular needs of a program. This effectively reduces the amount of effort generally required for software development.

The JDK also includes a compiler and a runtime system with a virtual machine (VM) for executing programs.[2] In general, software developers write programs in a programming language (in this case the Java programming language) that use classes from the API. Using the compiler, developers compile their programs into files containing "bytecodes." The runtime system integrates the bytecode files with selected classes from the API into an executable application. The Java VM (JVM) then executes the application by converting bytecodes into appropriate instructions executable within a particular operating system/computer hardware. The Java VM thus acts like an abstract computing machine, receiving instructions from programs in the form of bytecodes and interpreting these bytecodes by dynamically converting them into a form for execution, such as object code, and executing them.

[2] Details on the VM for the JDK can be found in a text entitled "The Java Virtual Machine Specification," by Tim Lindholm and Frank Yellin, Addison Wesley, 1996.

The JDK also employs lazy loading, which means that software attributes or classes are only loaded when they are used for the first time, thereby reducing memory usage and improving system response time. During runtime, the JVM invokes one or more class loaders to load any necessary classes. Class loaders are objects that can be defined using the Java™ programming language and represent instances of the class ClassLoader. The ClassLoader.loadClass method accepts a class name as an argument, and returns a Class object that is the runtime representation of a class type. These class loaders may be user-defined; a user may create a class loader to specify, for example, a remote location from which a class is to be loaded or to assign security attributes to a class loaded from a particular source.

At compile time, a class type is typically defined by the name of the class; this is sufficient because the compiler uses a single namespace (i.e., a set of names in which all names are unique). At runtime, however, class loaders may introduce multiple namespaces. As a result, a class type during runtime is defined not by its name alone, but rather by the combination of the class name and its defining class loader.

For example, at compile time, a class named "C" is uniquely identified by its name; and it has a class type represented by C, where C specifies the class name. At runtime, if a class named C is loaded by a class loader L1, L1 is referred to as the defining class loader (or defining loader) for a class named C. Accordingly, at runtime, the type of a class named C is represented by <C, L1>, where C specifies the class name and L1 specifies the class's defining loader. In the same regard, <C, L3> represents a different class type than <C, L1>, even though the two classes share the same name C.

The JVM uses L1, the defining loader for <C, L1> to load not only <C, L1>, but also to load, classes that are referenced by <C, L1>. Thus, for example, if <C, L1> references a class named "D," and that class is loaded by L1, then the type of that class is <D, L1>. A class loader may, however, initiate the loading of a class but delegate to another class loader the task of actually loading the class. For example, L1, the defining loader for <C, L1>, may initiate the loading of the class named D, but may delegate the responsibility of actually loading the class named D to another class loader L2. This may be represented by $<D, L2>^{L1}$, where D specifies the class name, L1 specifies the loader that initiated class loading (i.e., the initiating class loader), and L2 specifies D's defining loader. As used herein, notation such as $D^{L1}$ refers to a class named D having an initiating loader L1. Thus, based on whether loader L1 itself loads the class named D or delegates that responsibility to L2, the class type may be either <D, L1> or <D, L2>; in fact, <D, L1> and <D, L2> may be completely different and unrelated classes having different methods or fields.

This situation may lead to a lack of type safe linkage. A program is type safe if it only operates on data using operations that are defined for the type of that data. The type safe linkage problem may be demonstrated via a simple example, using the sample software code presented below. For the sake of clarity, the class type notation described above is used where class names would normally appear.

```
class <C, L1> {
    void f() {
        <E, L1>^{L1} x = <D, L2>^{L1}.g
    }
}
class <D, L2> {
    <E, L2>^{L2} g() {...}
class <E, L2> {
    private int secret_value;
}
class <E, L1> {
    public int secret_value;
}
```

Because <C, L1> is defined by L1, L1 is used to initiate the loading of classes named E and D referenced within <C, L1>. Although L1 is the defining loader for the class named E, L1 delegates to L2 the task of loading the class named D. As a result, L2 is the defining loader for the class named D, and is used by D.g to load the class named E. As it happens, the class named E loaded by L2 is different from the class named E loaded by L1. <C, L1> expects an instance of <E, L1> to be returned by D.g, but actually receives an instance of <E, L2>, which is a completely different class. Because of this difference, class <C, L1> is able to print the private field secret_value from an instance of <E, L2>, thereby compromising security. There exists, therefore, a need for a system that ensures type safe linkage in an environment that employs multiple runtime name spaces, user-defined class loaders, and lazy loading of classes.

SUMMARY OF THE INVENTION

Methods and apparatus consistent with the present invention, as embodied and broadly described herein, ensure type safe linkage of classes in an environment that employs multiple runtime name spaces, user-defined class loaders, and lazy loading of classes.

Consistent with the invention, a method for [to be completed using claim language].

BRIEF DESCRIPTION OF THE DRAWINGS

The accompanying drawings, which are incorporated in, and constitute a part of, this specification illustrate an embodiment of the invention and, together with the description, serve to explain the advantages and principles of the invention. In the drawings.

DETAILED DESCRIPTION

Reference will now be made in detail to an implementation of the present invention as illustrated in the accompanying drawings. The same reference numbers may be used throughout the drawings and the following description to refer to the same or like parts.

A. Overview

Methods and apparatus consistent with the invention ensure type safe linkage of classes in an environment that employs multiple runtime name spaces, user-defined class loaders, and lazy loading of classes. This is accomplished by creating and maintaining a set of loader constraints that are dynamically updated as class loading takes place.

More specifically, methods and apparatus consistent with the invention identify whether a class references an attribute that is contained in another class. The attribute may be, for example, a field, a method, or a method that is overridden by another method. If a class references an attribute that is contained in another class, a constraint is established. This constraint acts as a "promise" to later ensure type safe linkage. At some point later—for example, at the earliest time that the type is loaded by both loaders—methods and apparatus verify that the constraint has been met. This may be accomplished by verifying that the type for the attribute is the same regardless of whether it is loaded by a loader that defines the referencing class or a loader that defines the referred class. If the constraint is not met, an error message is provided.

B. Architecture

Figure 1:
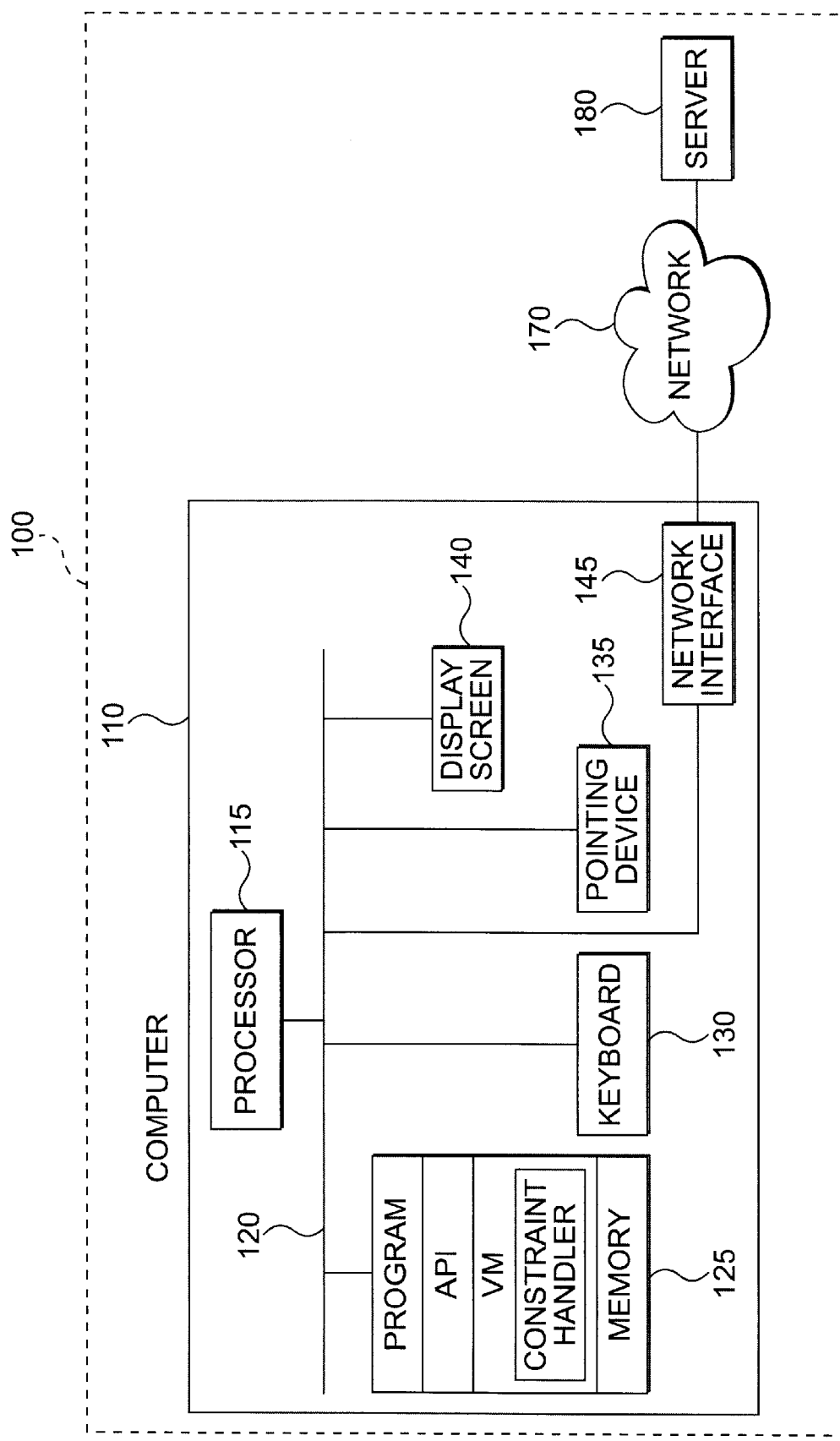
FIG. 1 is a block diagram of a computer system in which methods and apparatus consistent with the invention may be implemented.

FIG. 1 is a block diagram of a computer system 100 in which methods and apparatus consistent with the invention may be implemented. System 100 comprises a computer 110 connected to a server 180 via a network 170. Network 170 may be a local area network (LAN), a wide area network (WAN), or the Internet. System 100 is suitable for use with the Java™ programming language, although one skilled in the art will recognize that methods and apparatus consistent with the invention may be applied to other suitable user environments.

Computer 110 comprises several components that are all interconnected via a system bus 120. Bus 120 may be, for example, a bi-directional system bus that connects the components of computer 110, and contains thirty-two address lines for addressing a memory 125 and a thirty-two bit data bus for transferring data among the components. Alternatively, multiplex data/address lines may be used instead of separate data and address lines. Computer 110 communicates with other computers on network 170 via a network interface 145, examples of which include Ethernet or dial-up telephone connections.

Computer 110 contains a processor 115 connected to a memory 125. Processor 115 may be microprocessor manufactured by Motorola, such as the 680X0 processor or a processor manufactured by Intel, such as the 80X86 or Pentium processors, or a SPARC™ microprocessor from Sun Microsystems, Inc. However, any other suitable microprocessor or micro-, mini-, or mainframe computer, may be used. Memory 125 may comprise a RAM, a ROM, a video memory, or mass storage. The mass storage may include both fixed and removable media (e.g., magnetic, optical, or magnetic optical storage systems or other available mass storage technology). Memory 125 may contain a program, an application programming interface (API), and a virtual machine (VM) that contains instructions for handling constraints, consistent with the invention.

A user typically provides information to computer 110 via a keyboard 130 and a pointing device 135, although other input devices may be used. In return, information is conveyed to the user via display screen 140.

C. Architectural Operation

As used hereinafter, the term "attribute" refers to a method, a field, or both. Each attribute is associated with a "type," which may be a primitive type, such as int, or a reference type, such as a class or interface. As used hereinafter, the terms "type," "reference type," and "class type" may be used as shorthand for "class type."

Figure 2:
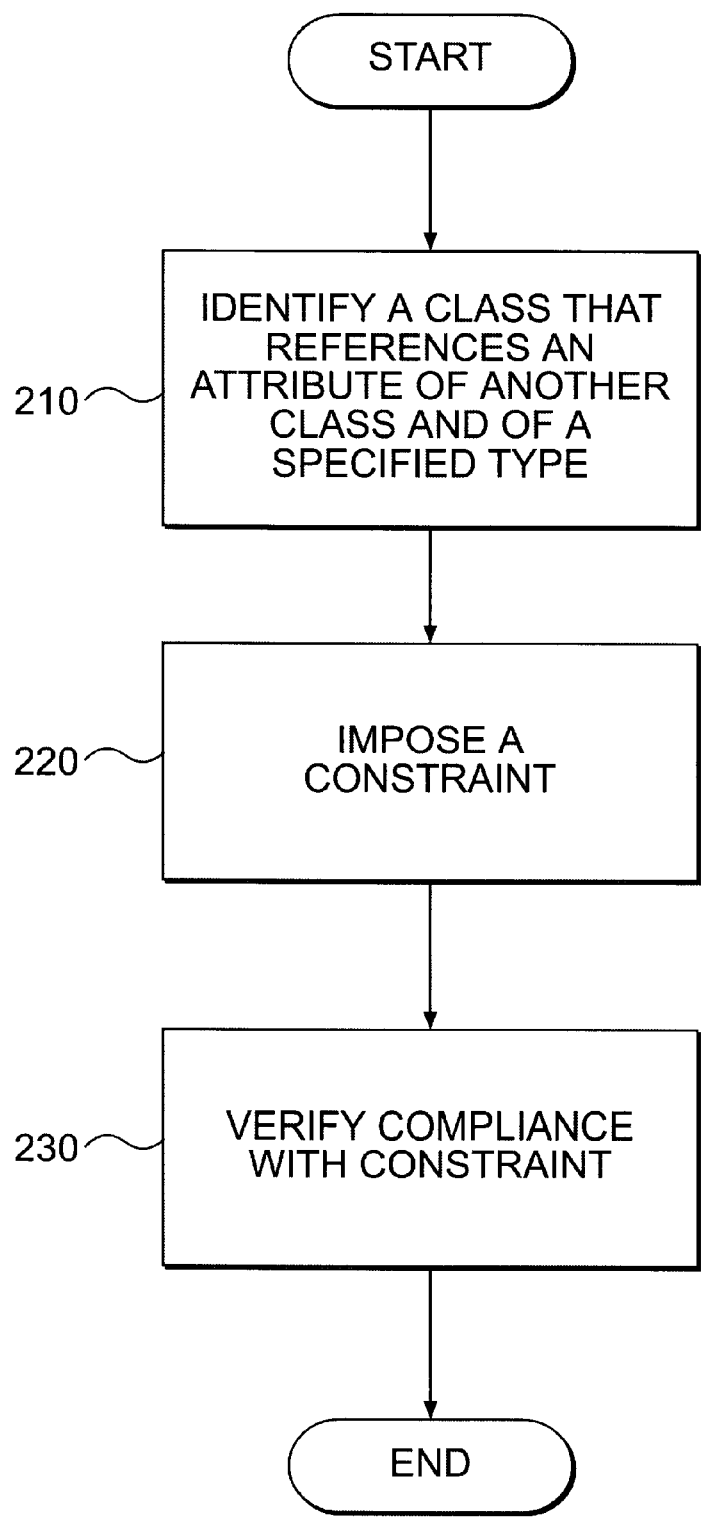
FIG. 2 is a flow diagram of a method for ensuring class type safe linkage consistent with the invention.

FIG. 2 is a flow diagram of a method for ensuring class type safe linkage consistent with the invention. After program execution begins, system 100 identifies a class that makes a symbolic reference to a class or attribute that is contained in another class (step 210). While resolving the symbolic reference, system 100 imposes a constraint that may later be used to ensure type safe linkage for the referenced attribute (step 220). In general, this constraint requires that the type of the referenced attribute when loaded by a loader that defines the referencing class be the same as the type for the referenced attribute when loaded by a loader that defines the referenced class. At some point later during execution, system 100 verifies compliance with the constraint (step 230).

Figure 3:
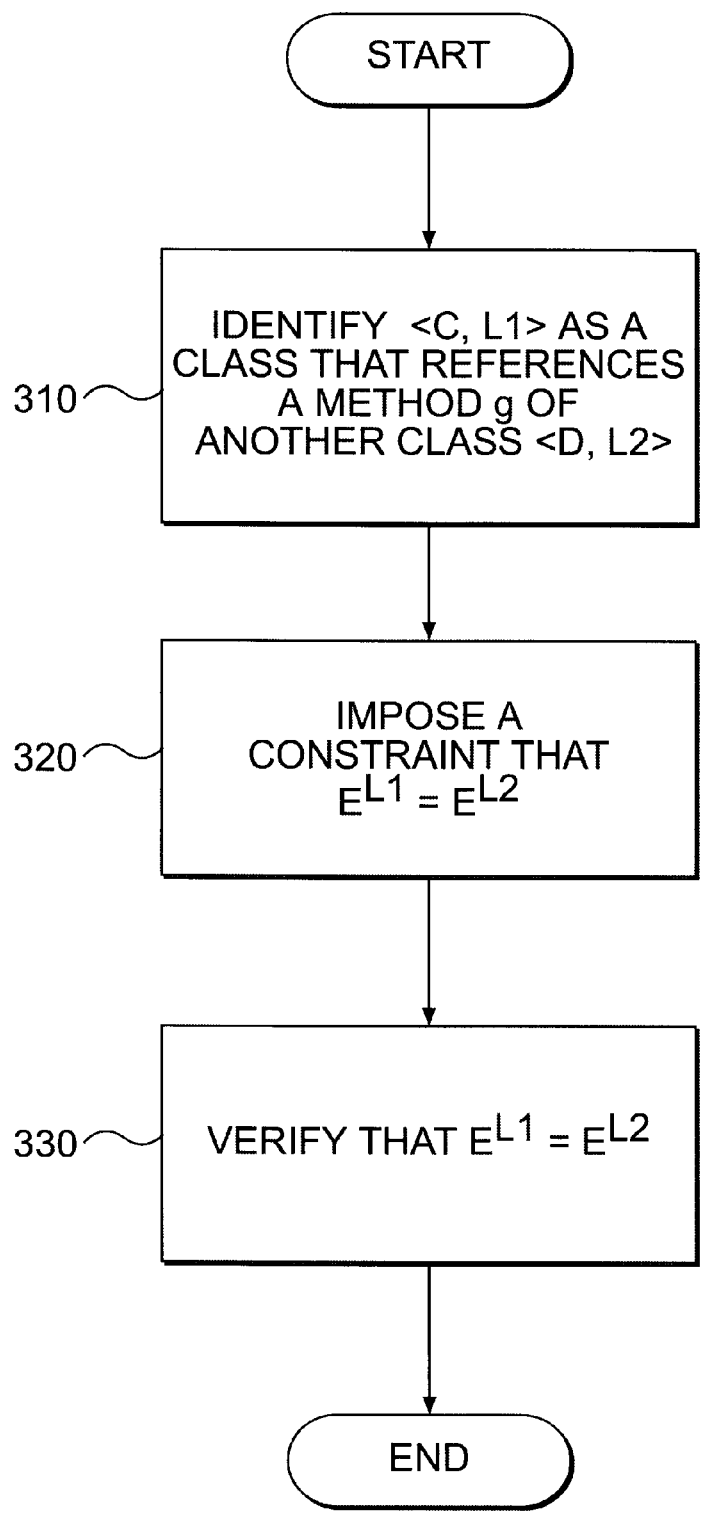
FIG. 3 is a flow diagram of an exemplary method for ensuring class type safe linkage consistent with the invention.

FIG. 3 is a flow diagram of an exemplary method for ensuring class type safe linkage consistent with the invention. For the sake of explanation, FIG. 3 is described in reference to the sample software code set forth in the Description of the Related Art.

In the example shown, system 100 identifies a class that makes a symbolic reference to a class or attribute that is contained in another class when system 100 executes an instruction contained in a class <C, L1> that references a method g( ) in a class <D, L2> (step 310). Resolving such a symbolic reference involves a loaded class cache (LCC) and a constraint table (CT).

A loaded class cache (LCC) maps a class name (e.g., E) and an initiating class loader (e.g., L1) to the runtime representation of a class type (e.g., $C_{L1}$). The combination of the class name and the initiating class loader constitute a "key" that yields a "return" class type. This may be represented as LCC(E,L1)=$C_{L1}$. When E is referenced, the JVM checks the LCC to determine whether E has previously been loaded by L1 (which is the defining loader of the referencing class). If so, the reference is resolved to the class type stored at the LCC entry for (E,L1). If not, the JVM loads the referenced class by using the initiating loader and enters the class into the LCC.

The CT maps a class name to a set of pairs. Each pair consists of a class type and a set of initiating class loaders. Given a class name, one can extract from the CT all constraints placed on the class. More specifically, for a given class named E, CT(E)={$P_1$ . . . $P_k$}, where each pair $P_i$=($S_i$, $T_i$), for i=1 . . . k, where $T_i$ represents a class type and where $S_i$={Li1 . . . Lin}, where each Li represents an initiating loader.

To create an entry LCC(E,L1)=$T_{L1}$, the JVM creates an LCC entry indexed by the key (E,L1) with a null class type. If no entry CT(E) exists, the JVM creates a CT entry indexed by E, and initializes it to an empty set. The JVM also checks each pair $P_i$ from CT(E) to see if L1 is in $S_i$. If there does not exist such a pair $P_i$ (i.e., there exists no constraint on $E^{L1}$), the JVM sets LCC(E,L1)=TL1. If there exists such a pair $P_i$ (i.e., there exists a constraint on $E^{L1}$), the JVM checks to see if the two class types, $T_{L1}$ and Ti, are compatible. Two class types are compatible if they are the same or if one is a null type. In other words, compatible($T_{L1}$,$T_i$)=($T_{L1}$=$T_i$) or ($T_{L1}$=null) or ($T_i$=null). If the two class types $T_{L1}$ and $T_i$ are not compatible, an error is indicated. If the two types are compatible, the pair $P_i$ is set to ($S_i$,join($T_i$, $T_{L1}$)) and LCC(E, L1)=$T_{L1}$. Join($T_i$, $T_{L1}$)=$T_{L1}$ if $T_i$ is null, otherwise the result is $T_i$ (assuming $T_i$ and $T_{L1}$ are compatible as defined above). The JVM also checks to ensure that the class type actually loaded has the same name as the referenced class. If it does not, an error is indicated.

While resolving the symbolic reference, system 100 imposes a constraint that requires that the type of the referenced attribute (e.g., the class named $E^{L1}$) when loaded by a loader that defines the referencing class (e.g., L1 for <C, L1>) be the same as the type for the referenced attribute (e.g., the class named $E^{L2}$) when loaded by a loader that defines the referenced class (e.g., L2 for <D, L2>). In the example shown, system 100 imposes the constraint that $E^{L1}$=$E^{L2}$ (step 320). In one embodiment, both the identifying step and the step of imposing the constraint are performed when the method call to D.g is resolved.

The specific constraint imposed may vary depending on the programming language or the nature of the reference, but some examples for the Java™ programming language include the following:

If <C, L1> references a field E fieldname;
declared in class <D, L2>, then the following constraint may be generated: $E^{L1}$=$E^{L2}$.

If <C, L1> contains an invocation of a method E0 methodname (E1, E2, . . . , En);

declared in class <D, L2>, then the following constraints may be generated: $E0^{L1}$=$E0^{L2}$,$E1^{L1}$=$E1^{L2}$, . . . , $En^{L1}$= $En^{L2}$.

If <C, L1> declares a method E0 methodname (E1, E2, . . . , En);
inherited from a declaration in a class <D, L2>, then the following constraint is generated: $E0^{L1}$=$E0^{L2}$, $E1^{L1}$=$E1^{L2}$, . . . , $En^{L1}$=$E^{L2}$.

At some point later during execution, the constraint is verified to ensure type safe linkage. For example, this may occur at the earliest time that the type for the referenced attribute (e.g., the class named E) is loaded by both the loaders that define the referencing class (L1) and the referenced class (L2 ) (step 330). In some cases, the constraint may be verified when the type for the referenced attribute (e.g., the class named E) is loaded by only one of the loaders that define the referencing class (L1) and the referenced class (L2 ). During the process of loading the class named E using both L1 and L2 , system 100 receives identification of the loader that defines the class named E in each case. System 100 may compare this information to ensure that the same defining loader is used to load the class named E regardless of whether the loading of the class named E is initiated by L1 or L2. If the verification fails, an error message may be generated.

A constraint such as $E^{L1}$=$E^{L2}$ is imposed or generated as follows. If there exists no entry CT(E), then one is created by creating an entry in the CT that is indexed by E and is initialized to an empty set. If there exists no entry LCC(E, L1), then one is created as described above. If there exists no entry LCC(E,L2), then one is created as described above. This results in one of four possible combinations for CT(E)= {$P_1$ . . . $P_k$}.

The first possibility is that there exist no constraints on either $E^{L1}$ or $E^{L2}$. In other words, no set $S_i$ contains either L1 or L2. If $E^{L1}$ and $E^{L2}$ are not compatible (as defined above), an error is indicated. Otherwise, the JVM sets P=({L1,L2}, join($E^{L1}$, $E^{L2}$)) and adds P to CT(E).

The second possibility is that $E^{L1}$ is constrained but $E^{L2}$ is not yet constrained. In other words, a set $S_{L1}$ contains L1, but no set $S_i$ contains L2. In this case, the JVM checks to ensure that $T_{L1}$ (the class type corresponding to $E^{L1}$) and $E^{L2}$ are compatible (as defined above). If not, an error is indicated. If they are compatible, L2 is added to $S_{L1}$ and $P_{L1}$ is set to ($S_{L1}$, join($T_{L1}$, $E^{L2}$)).

The third possibility is that $E^{L2}$ is constrained but $E^{L1}$ is not yet constrained. In other words, a set $S_{L2}$ contains L2, but no set $S_i$ contains L1. In this case, the JVM checks to ensure that $T_{L2}$ (the class type corresponding to $E^{L2}$) and $E^{L1}$ are compatible (as defined above). If not, an error is indicated. If they are compatible, L1 is added to $S_{L2}$ and $P_{L2}$ is set to ($S_{L2}$, join($T_{L2}$, $E^{L1}$)).

The fourth possibility is that both $E^{L1}$ and $E^{L2}$ are constrained. In other words, a set $S_{L1}$ contains L1, and a set $S_{L2}$ contains L2. If $S_{L1}$=$S_{L2}$, the constraint already exists and no action is necessary. Otherwise, the JVM checks to ensure that $T_{L1}$ (the class type corresponding to $E^{L1}$) and $T_{L2}$ (the class type corresponding to $E^{L2}$) are compatible (as defined above). If not, an error is indicated. If they are compatible, $S_{L1}$ and $S_{L2}$ are merged into anew set S, and P is set to (S, join($T_{L1}$, $T_{L2}$)). P is added to CT(E) and $P_{L1}$ and $P_{L2}$ are removed from CT(E).

D. Conclusion

As described in detail above, methods and apparatus consistent with the invention ensure type safe linkage of classes in an environment that employs multiple runtime name spaces, user-defined class loaders, and lazy loading of classes. The foregoing description of an implementation of the invention has been presented for purposes of illustration and description. Modifications and variations are possible in light of the above teachings or may be acquired from practicing the invention.

For example, although the example used in the description indicates that the result of the method call to D.g is placed into a variable x that is of type $<E, L1>^{L1}$, methods and apparatus consistent with the invention do not require that the referencing class (e.g., $<C, L1>$) actually contain a variable or attribute that is of the same type as the referenced attribute. Furthermore, the description above indicates that the imposition and verification of the constraints are performed at certain times during execution, but those skilled in the art will recognize that those steps may be performed at other times during execution. Moreover, the description above is based on reference types based on one or more classes, but those skilled in the art will recognize that the invention is consistent with other types.

In addition, the foregoing description is based on the Java™ programming environment, but those skilled in the art will recognize that another programming environment may be used consistent with the invention. Moreover, although the described implementation includes software, the invention may be implemented as a combination of hardware and software or in hardware alone. Additionally, although aspects of the present invention are described as being stored in memory, one skilled in the art will appreciate that these aspects can also be stored on other types of computer-readable media, such as secondary storage devices, like hard disks, floppy disks, or CD-ROM; a carrier wave from the Internet; or other forms of RAM or ROM. The scope of the invention is therefore defined by the claims and their equivalents.

What is claimed is:

1. A computer-implemented method for ensuring type safe linkage, comprising:
    identifying a first class that references an attribute that (i) is contained in a second class and (ii) is of a specified type;
    imposing a constraint on program instructions that the specified type when loaded by a loader that defines the first class is the same as the specified type when loaded by a loader that defines the second class; and verifying compliance with the constraint.

2. The computer-implemented method of claim 1, wherein identifying a first class that references an attribute that (i) is contained in a second class and (ii) is of a specified type farther comprises identifying a first class that references a field that (iii) is contained in a second class and (iv) is of a specified type.

3. The computer-implemented method of claim 1, wherein identifying a first class that references an attribute that (i) is contained in a second class and (ii) is of a specified type further comprises identifying a first class that references a method that (iii) is contained in a second class and (iv) is of a specified type.

4. The computer-implemented method of claim 1, wherein identifying a first class that references an attribute that (i) is contained in a second class and (ii) is of a specified type further comprises identifying a first class that overrides a method that (iii) is contained in a second class and (iv) is of a specified type.

5. The computer-implemented method of claim 1, wherein verifying compliance with the constraint further comprises verifying compliance with the constraint when the specified type has been loaded by at least one of the loaders that define the first and second classes.

6. A computer-implemented method for ensuring class type safe linkage, comprising:
    identifying a first class that references an attribute that (i) is contained in a second class and (ii) has a type defined by a third class;
    imposing a constraint on program instructions that the third class when loaded by a loader that defines the first class is the same as the third class when loaded by a loader that defines the second class; and
    verifying compliance with the constraint when the third class has been loaded by at least one of the loaders that define the first and second classes.

7. A computer-implemented method for ensuring class type safe linkage in a runtime environment having a first class that is defined by a first loader, a second class that is defined by a second loader that may be different from the first loader, the first class referencing an attribute that is contained in the second class and that has a type defined by a third class, comprising:
    imposing a constraint on program instructions that the third class as loaded by the first loader is the same as the third class as loaded by the second loader; and
    verifying compliance with the constraint when the third class has been loaded by at least one of the first loader and the second loader.

8. A computer-implemented method for ensuring class type safe linkage, comprising:
    identifying a class $<C, L1>$ that references a field y, of type named E, declared in class $<D, L2>$;
    imposing a constraint that $E^{L1}=E^{L2}$; and
    verifying compliance with each of the constraints when at least one of $E^{L1}$ and $E^{L2}$ is loaded during the course of normal execution.

9. A computer-implemented method for ensuring class type safe linkage, comprising:
    identifying a class $<C, L1>$ that references a method g( ) declared in a class $<D, L2>$, wherein the method g( ) accepts as arguments attributes of types named E1, E2, . . . En and has a return type named E0;
    imposing constraints that $E0^{L1}=E0^{L2}$, $E1^{L1}=E1^{L2}$, . . . $En^{L1}=En^{L2}$; and
    verifying compliance with each of the constraints when at least one of $En^{L1}$ and $En^{L2}$ has both been loaded.

10. A computer-implemented method for ensuring class type safe linkage, comprising:
    identifying a class $<C, L1>$ that declares a method g( ) inherited from a declaration of a class $<D, L2>$, wherein the method g( ) declares argument types named E1, E2, . . . En and has a return type named E0;
    imposing constraints that $E0^{L1}=E0^{L2}$, $E1^{L1}=E1^{L2}$, . . . $En^{L1}=En^{L2}$; and
    verifying compliance with each of the constraints when at least one of $En^{L1}$ and $En^{L2}$ has both been loaded.

11. A computer-implemented method for ensuring type safe linkage, comprising:
    identifying a first module that references an attribute that (i) is contained in a second module and (ii) is of a specified type;
    imposing a constraint on program instructions that the specified type when loaded by a loader that defines the first module is the same as the specified type when loaded by a loader that defines the second module; and
    verifying compliance with the constraint subsequent to imposing the constraint.

12. A computer-implemented method for ensuring class type safe linkage, comprising:
   identifying a first class that references an attribute that (i) is contained in a second class and (ii) has a type defined by a third class;
   imposing a constraint on program instructions that a defining loader used by the first class to load the third class be the same defining loader used by the second class to load the third class; and
   verifying compliance with the constraint when the third class has been loaded by at least one of the defining loaders of the first and second classes.

13. A computer-implemented method for ensuring class type safe linkage, comprising:
   identifying a class <C, L1> that references a field y, of type E, declared in class <D, L2>;
   imposing a constraint that $E^{L1}=E^{L2}$; and
   verifying compliance with each of the constraints at the earliest possible time without performing any class loading other than that required for normal program execution.

14. An apparatus for ensuring class type safe linkage, comprising:
   at least one memory having program instructions, and
   at least one processor configured to use the program instructions to:
      identify a first class that references an attribute that (i) is contained in a second class and (ii) is of a specified type;
      impose a constraint on program instructions that the specified type when loaded by a loader that defines the first class is the same as the specified type when loaded by a loader that defines the second class; and
      verify compliance with the constraint.

15. The apparatus of claim 14, wherein the program instructions to identify a first class that references an attribute that (i) is contained in a second class and (ii) is of a specified type further comprise program instructions to identify a first class that references a field that (iii) is contained in a second class and (iv) is of a specified type.

16. The apparatus of claim 14, the program instructions to identify a first class that references an attribute that (i) is contained in a second class and (ii) is of a specified type further comprise program instructions to identify a first class that references a method that (iii) is contained in a second class and (iv) is of a specified type.

17. The apparatus of claim 14, wherein the program instructions to identify a first class that references an attribute that (i) is contained in a second class and (ii) is of a specified type further comprise program instructions to identify a first class that references an overridden method that (iii) is contained in a second class and (ii) is of a specified type.

18. The apparatus of claim 14, wherein the program instructions to verify compliance with the constraint further comprise program instructions to verify compliance with the constraint when the specified type has been loaded by at least one of the loaders that define the first and second classes.

19. An apparatus for ensuring class type safe linkage, comprising:
   at least one memory having program instructions, and
   at least one processor configured to use the program instructions to:
      identify a first class that references an attribute that (i) is contained in a second class and (ii) has a type defined by a third class;
      impose a constraint on program instructions that the third class when loaded by a loader that defines the first class is the same as the third class when loaded by a loader that defines the second class; and
      verify compliance with the constraint when the third class has been loaded by at least one of the loaders that define the first and second classes.

20. An apparatus for ensuring class type safe linkage in a runtime environment having a first class that is defined by a first loader, a second class that is defined by a second loader that may be different from the first loader, the first class referencing an attribute that is contained in the second class and that has a type defined by the third class, comprising:
   at least one memory having program instructions, and
   at least one processor configured to use the program instructions to:
      impose a constraint on program instructions that the third class as loaded by the first loader is the same as the third class as loaded by the second loader; and
      verify compliance with the constraint when the third class has been loaded by at least one of the first loader and the second loader.

21. An apparatus for ensuring class type safe linkage, comprising:
   at least one memory having program instructions, and
   at least one processor configured to use the program instructions to:
      identify a class <C, L1> that references a field y, of type named E, declared in class <D, L2>;
      impose a constraint that $E^{L1}=E^{L2}$; and
      verify compliance with each of the constraints when at least one of $E^{L1}$ and $E^{L2}$ is loaded during the course of normal execution.

22. An apparatus for ensuring class type safe linkage, comprising:
   at least one memory having program instructions, and
   at least one processor configured to use the program instructions to:
      identify a class <C, L1> that references a method g( ) of a class <D, L2>, wherein the method g( ) accepts as arguments attributes of types named E1, E2, . . . En and has a return type named E0;
      impose constraints that $E0^{L1}=E0^{L2}$, $E1^{L1}=E1^{L2}$, . . . $En^{L1}=En^{L2}$; and
      verify compliance with each of the constraints when at least one of $En^{L1}$ and $En^{L2}$ has both been loaded.

23. An apparatus for ensuring class type safe linkage, comprising:
   at least one memory having program instructions, and
   at least one processor configured to use the program instructions to:
      identify a class <C, L1> that declares a method g( ) inherited from a class <D, L2>, wherein the method g( ) declares argument types named E1, E2, . . . En and has a return type named E0;
   impose constraints that $E0^{L1}=E0^{L2}$, $E1^{L1}=E1^{L2}$, . . . $En^{L1}=En^{L2}$; and
   verify compliance with each of the constraints when at least one of $En^{L1}$ and $En^{L2}$ has both been loaded.

24. An apparatus for ensuring type safe linkage, comprising:
   at least one memory having program instructions, and
   at least one processor configured to use the program instructions to:
      identify a first module that references an attribute that (i) is contained in a second module and (ii) is of a specified type;

impose a constraint on program instructions that the specified type when loaded by a loader that defines the first module is the same as the specified type when loaded by a loader that defines the second module; and verify compliance with the constraint subsequent to imposing the constraint.

25. An apparatus for ensuring class type safe linkage, comprising:

at least one memory having program instructions, and at least one processor configured to use the program instructions to:

identify a first class that references an attribute that (i) is contained in a second class and (ii) has a type defined by a third class;

impose a constraint on program instructions that a defining loader used by the first class to load the third class be the same defining loader used by the second class to load the third class; and verify compliance with the constraint when the third class has been loaded by at least one of the defining loaders of the first and second classes.

26. An apparatus for ensuring class type safe linkage, comprising:

at least one memory having program instructions, and at least one processor configured to use the program instructions to:

identify a class <C, L1> that references a field y, of type E, declared in class <D, L2>;

impose a constraint that $E^{L1}=E^{L2}$; and verify compliance with each of the constraints at the earliest possible time without performing any class loading other than that required for normal program execution.

27. A computer-readable medium containing instructions for controlling a computer system to perform a method for ensuring class type safe linkage, the method comprising:

identifying a first class that references an attribute that (i) is contained in a second class and (ii) is of a specified type;

imposing a constraint on program instructions that the specified type when loaded by a loader that defines the first class is the same as the specified type when loaded by a loader that defines the second class; and verifying compliance with the constraint.

28. The computer-readable medium of claim 27, wherein identifying a first class that references an attribute that (i) is contained in a second class and (ii) is of a specified type further comprises identifying a first class that references a field that (iii) is contained in a second class and (iv) is of a specified type.

29. The method of claim 27, wherein identifying a first class that references an attribute that (i) is contained in a second class and (ii) is of a specified type further comprises identifying a first class that references a method that (iii) is contained in a second class and (iv) is of a specified type.

30. The method of claim 27, wherein identifying a first class that references an attribute that (i) is contained in a second class and (ii) is of a specified type further comprises identifying a first class that references an overridden method that (iii) is contained in a second class and (ii) is of a specified type.

31. The method of claim 27, wherein verifying compliance with the constraint further comprises verifying compliance with the constraint when the specified type has been loaded by at least one of the loaders that define the first and second classes.

32. A computer-readable medium containing instructions for controlling a computer system to perform a method for ensuring class type safe linkage, the method comprising:

identifying a first class that references an attribute that (i) is contained in a second class and (ii) has a type defined by a third class;

imposing a constraint on program instructions that the third class when loaded by a loader that defines the first class is the same as the third class when loaded by a loader that defines the second class; and verifying compliance with the constraint when the third class has been loaded by at least one of the loaders that define the first and second classes.

33. A computer-readable medium containing instructions for controlling a computer system to perform a method for ensuring class type safe linkage in a runtime environment having a first class that is defined by a first loader, a second class that is defined by a second loader that may be different from the first loader, the first class referencing an attribute that is contained in the second class and that has a type defined by the third class, the method comprising:

imposing a constraint on program instructions that the third class as loaded by the first loader is the same as the third class as loaded by the second loader; and verifying compliance with the constraint when the third class has been loaded by at least one of the first loader and the second loader.

34. A computer-readable medium containing instructions for controlling a computer system to perform a method for ensuring class type safe linkage, the method comprising:

identifying a class <C, L1> that references a field y, of type named E, declared in class <D, L2>;

imposing a constraint that $E^{L1}=E^{L2}$; and verifying compliance with each of the constraints when at least one of $E^{L1}$ and $E^{L2}$ is loaded during the course of normal execution.

35. A computer-readable medium containing instructions for controlling a computer system to perform a method for ensuring class type safe linkage, the method comprising:

identifying a class <C, L1> that references a method g( ) of a class <D, L2>, wherein the method g( ) accepts as arguments attributes of types named E1, E2, . . . En and has a return type named E0;

imposing constraints that $E0^{L1}=E0^{L2}$, $E1^{L1}=E1^{L2}$, . . . $En^{L1}=En^{L2}$; and verifying compliance with each of the constraints when at least one of $En^{L1}$ and $En^{L2}$ has both been loaded.

36. A computer-readable medium containing instructions for controlling a computer system to perform a method for ensuring class type safe linkage, the method comprising:

identifying a class <C, L1> that declares a method g( ) inherited from a class <D, L2>, wherein the method g( ) declares argument types named E1, E2, . . . En and has a return type named E0;

imposing constraints that $E0^{L1}=E0^{L2}$, $E1^{L1}=E1^{L2}$, . . . $En^{L1}=En^{L2}$; and verifying compliance with each of the constraints when at least one of $En^{L1}$ and $En^{L2}$ has both been loaded.

37. A computer-readable medium containing instructions for controlling a computer system to perform a method for ensuring class type safe linkage, the method comprising:

identifying a first module that references an attribute that (i) is contained in a second module and (ii) is of a specified type;

imposing a constraint on program instructions that the specified type when loaded by a loader that defines the first module is the same as the specified type when loaded by a loader that defines the second module; and verifying compliance with the constraint subsequent to imposing the constraint.

38. A computer-readable medium containing instructions for controlling a computer system to perform a method for ensuring class type safe linkage, the method comprising:

identifying a first class that references an attribute that (i) is contained in a second class and (ii) has a type defined by a third class;

imposing a constraint on program instructions that a defining loader used by the first class to load the third class be the same defining loader used by the second class to load the third class; and verifying compliance with the constraint when the third class has been loaded by at least one of the defining loaders of the first and second classes.

39. A computer-readable medium containing instructions for controlling a computer system to perform a method for ensuring class type safe linkage, the method comprising:

identifying a class <C, L1> that references a field y, of type E, declared in class <D, L2>;

imposing a constraint that $E^{L1}=E^{L2}$; and verifying compliance with each of the constraints at the earliest possible time without performing any class loading other than that required for normal program execution.

* * * * *

UNITED STATES PATENT AND TRADEMARK OFFICE
CERTIFICATE OF CORRECTION

PATENT NO. : 6,430,569 B1  
DATED : August 6, 2002  
INVENTOR(S) : Gilad Bracha et al.

It is certified that error appears in the above-identified patent and that said Letters Patent is hereby corrected as shown below:

Column 7,
Line 48, "farther" should read -- further --;

Column 9,
Line 52, "and (ii)" should read -- and (iv) --;

Column 11,
Lines 52, 57 and 63, "method" should read -- computer readable medium --;
Line 61, "and (ii)" should read -- and (iv) --; and Column 12,
Line 54, delete the line break after "method g(" so that it reads -- method g() --.

Signed and Sealed this

Twenty-sixth Day of November, 2002

Attest:

JAMES E. ROGAN
*Attesting Officer*  *Director of the United States Patent and Trademark Office*